United States Patent
Nakatsugawa et al.

(10) Patent No.: US 6,657,413 B2
(45) Date of Patent: Dec. 2, 2003

(54) DRIVING EQUIPMENT FOR SYNCHRONOUS MOTORS

(75) Inventors: Junnosuke Nakatsugawa, Hitachi (JP); Yukio Kawabata, Hitachinaka (JP); Tsunehiro Endo, Hitachiota (JP); Masashi Kitamura, Mito (JP); Junya Kaneda, Tokai (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/955,996

(22) Filed: Sep. 20, 2001

(65) Prior Publication Data

US 2002/0180398 A1 Dec. 5, 2002

(30) Foreign Application Priority Data

Jun. 1, 2001 (JP) ......................................... 2001-166011

(51) Int. Cl.[7] .............................. H02P 1/46; H02P 3/18; H02P 5/28; H02P 7/36
(52) U.S. Cl. ........................ 318/700; 318/138; 318/254; 318/432; 318/434; 318/439; 318/721; 318/724
(58) Field of Search ................................. 318/138, 432, 318/434, 439, 700, 254, 430, 800, 721, 724

(56) References Cited

U.S. PATENT DOCUMENTS

| | | | | |
|---|---|---|---|---|
| 4,450,395 A | * | 5/1984 | Kawamura et al. | 318/700 |
| 6,208,109 B1 | * | 3/2001 | Yamai et al. | 318/716 |
| 6,329,781 B1 | * | 12/2001 | Matsui et al. | 318/717 |
| 6,339,308 B2 | * | 1/2002 | Shinnaka | 318/701 |
| 6,396,229 B1 | * | 5/2002 | Sakamoto et al. | 318/439 |
| 6,414,462 B2 | * | 7/2002 | Chong | 318/701 |

FOREIGN PATENT DOCUMENTS

| | | |
|---|---|---|
| EP | 0810143 | 12/1997 |
| JP | 07308088 | 11/1995 |
| JP | 7-308088 | 11/2000 |
| JP | 2000358400 | 12/2000 |
| JP | 2000-358400 A | 12/2000 |

OTHER PUBLICATIONS

Hyeoun–Dong Lee, et al., "Efficiency–Optimized Direct Torque Control of Synchronous Reluctance Motor Using Feedback Linearization" IEEE Tranactions on Industrial Electronics, vol. 46, No. 1, Feb., 1999.
European Search Report.
M.G. Jovanovic et al "Off–line testing of reluctance machines" IEEE Transactions on Energy Conversion, vol. 14, No. 3, pp. 264–269, Sep. 1999.
Nakatsugawa et al "A Fundamental Investigation about Maximum Torque Control of Synchronous Reluctance Motor" Proceedings of the Power Conversation Conference—Osaka 2002, vol. II, pp. 704–709, Apr. 2002.

* cited by examiner

*Primary Examiner*—Bentsu Ro
*Assistant Examiner*—Tyrone Smith
(74) *Attorney, Agent, or Firm*—Crowell & Moring LLP (57) ABSTRACT

Providing control apparatus with a maximum torque/current ratio control means by which the relationship between the maximum torque and current amplitudes and the relationship between the maximum torque and current phases are converted to numeric expressions including one or more than one linear function with the torque taken as the parameter, then the current amplitude command and current phase command data that yields a maximum torque is computed, and computed data is sent as an output signal.

6 Claims, 7 Drawing Sheets

DRIVING EQUIPMENT FOR SYNCHRONOUS MOTORS

BACKGROUND OF THE INVENTION

The present invention relates to driving equipment intended for synchronous motors; the invention relates more specifically to driving equipment that improves the output torque of a synchronous motor and enables highly efficient operation of the motor.

Various methods are proposed for the linearization of the output torque of a synchronous motor. Japanese Application Patent Laid-open Publication No. 2000-358400, for example, discloses a method in which the output torque can be linearized without providing sophisticated calculation operations on torque command values.

Various methods are also proposed for highly efficient control of a synchronous motor. To operate motors very efficiently, it is desirable that when motor currents of the same magnitude are applied, the resulting output torque should be utilized to their maximums. It is therefore considered that maximum torque per ampere control can be realized by converting the relationship of the maximum torque with respect to the motor currents to mathematical modeling or table form. Japanese Application Patent Laid-open Publication No. Hei 07-308088, for example, discloses a method in which the appropriate current amplitude command and current phase command can be calculated using the torque command and rotational speed of the motor as the parameters.

Highly efficient control cannot always be achieved using the method disclosed in Japanese Application Patent Laid-open Publication No. 2000-358400 mentioned above. In addition, in Japanese Application Patent Laid-open Publication No. Hei 07-308088 mentioned above, although a method of calculating current amplitude and current phase command values is described in which the function corresponding to the particular torque command value is to be stored in numeric expression form to memory each time the current amplitude command value and the current phase command value are to be calculated, more specific numeric expressions are not disclosed. Furthermore, in Japanese Application Patent Laid-open Publication No. Hei 07-308088 mentioned above, although a method of storing function patterns to memory and reading out the data each time is disclosed, this method has the disadvantage that the volume of data to be stored to memory tends to increase.

Because of its complexity, the relationship between the torque and current of a synchronous motor is not easy to formulate accurately. The use of complex calculation equations during the formulation increases the amount of calculation required and, hence, the calculation time, and requires an expensive microcomputer for control. For these reasons, it is desirable that when a function is to be stored as a numeric expression and then to be calculated each time, the calculation should be conducted using a calculation equation as simple as possible.

SUMMARY OF THE INVENTION

The present invention is intended to supply a method and equipment by which the output torque and speed control system of a synchronous motor can be linearized using an inexpensive microcomputer, instead of providing sophisticated calculation operations, and thus the motor can be controlled with high efficiency.

The driving equipment for synchronous motors that pertains to the present invention is equipped with an inverter for converting a direct-current voltage to an alternating current or a direct current and supplying the current to a synchronous motor, control apparatus for controlling the output voltage and frequency of the inverter, and a means for detecting or estimating the rotational speed of said synchronous motor, wherein said control apparatus is further equipped with a means for issuing such a torque command that matches said rotational speed and a rotational speed command, and a means for first receiving said torque command as an input signal, then computing current amplitude and current phase data, and sending the data as an output signal, and in addition, there is provided a maximum torque/current ratio control means by which the relationships between the maximum torque and the current amplitude and between the maximum torque and the current phase are converted to numeric expressions having the torque represented by a parameterized function, and current amplitude command and current phase command data with which the maximum torque can be obtained with respect to the entered torque command is computed and transmitted as output data. In the driving equipment for synchronous motors that pertains to the present invention, the parameterized function denoting the above-mentioned torque acts as a linear function or a quadratic function.

The driving equipment for synchronous reluctance motors that pertains to the present invention is equipped with a maximum torque/current ratio control means by which the relationships between the maximum torque and the current amplitude and between the maximum torque and the current phase are converted to numeric expressions having the torque represented by a parameterized function, and current amplitude command and current phase command data with which the maximum torque can be obtained with respect to the entered torque command is computed and transmitted as output data, and the parameterized function denoting the above-mentioned torque acts as a linear function or a quadratic function.

DETAILED DESCRIPTION OF THE INVENTION

The following describes the embodiments of the present invention according to Figures.

(Embodiment 1)

Figure 1:
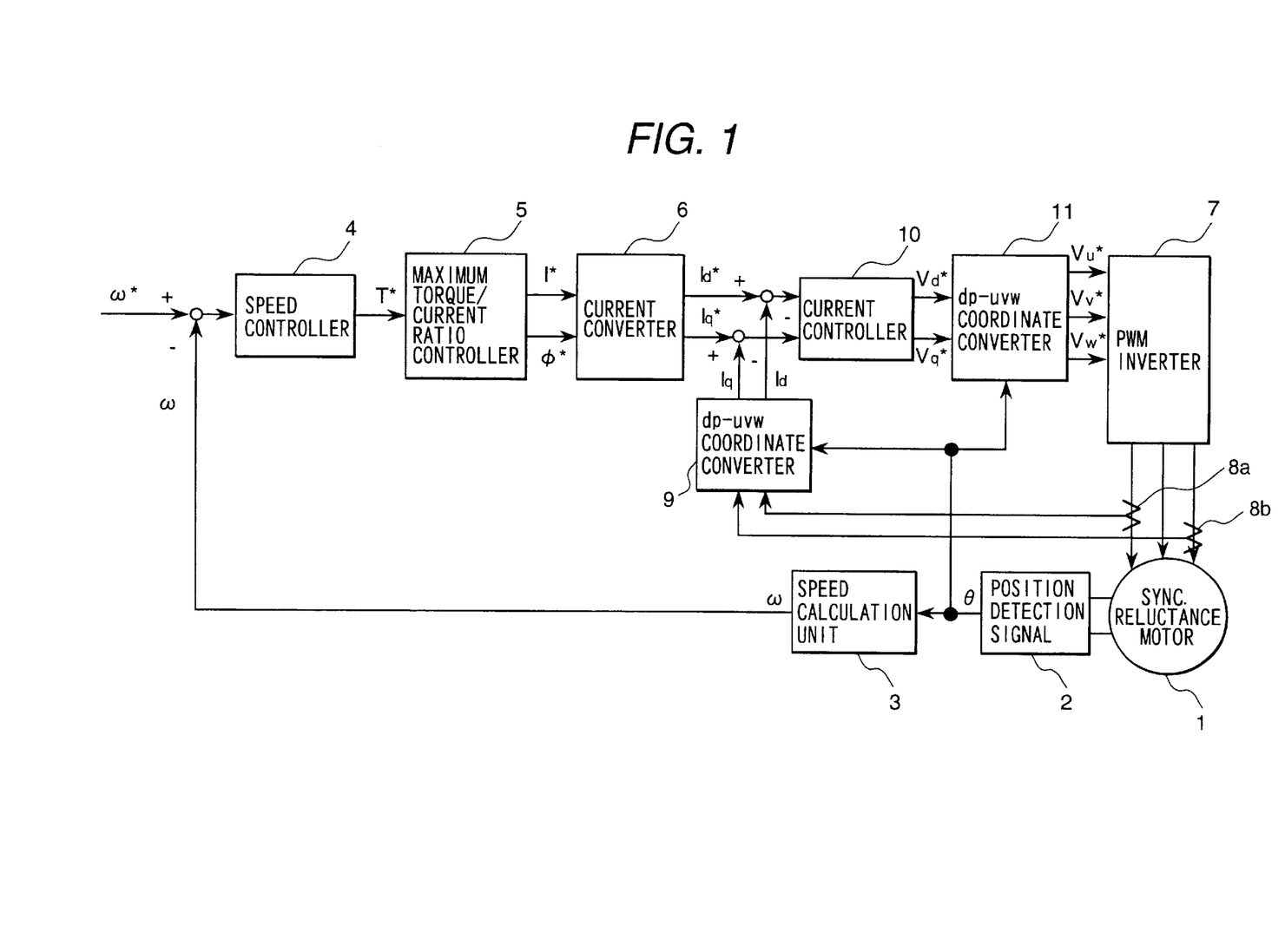
FIG. 1 is a block diagram of the synchronous reluctance motor variable-speed control system shown in embodiment 1.

A block diagram of the synchronous reluctance motor driving system used in this embodiment is shown as FIG. 1. Numeral 1 in FIG. 1 denotes the synchronous reluctance motor to be controlled, and the rotor of this motor has a position detector 2. The synchronous reluctance motor shown in this embodiment is a motor in which a plurality of annular magnetic paths are formed by providing multilayer slits in the core of the motor rotor. Rotor position signal $\phi$, the output signal from position detector 2, is sent to a speed calculation unit 3, from which a rotational speed value $\omega$ is then acquired. When the rotational speed value $\omega$ is sent to a speed controller 4, the speed controller 4 will compute torque command value T* so as to match rotational speed value $\omega$ and rotational speed command value $\omega$*, and then the torque command value T* will be sent to a maximum torque/current ratio controller 5. The maximum torque/current ratio controller 5 will compute and send the current amplitude command value I* and the current phase command value $\phi$* from the torque command value T* by using a linear function in which the torque is taken as the parameter. These current amplitude command value I* and current phase command value $\phi$* will be further sent to a current converter 6, which will then issue the d(direct)-axis current command Id* and q(quadratic)-axis current command Iq* for the two axes denoted as a d-axis and a q-axis.

A synchronous reluctance motor 1 has a connected PWM inverter 7. PWM inverter 7 supplies an alternating-current (AC) voltage of a variable frequency to synchronous reluctance motor 1, subject to a PWM signal. A current detector 8a for detecting a U-phase current, and a current detector 8b for detecting a W-phase current are arranged in the line that connects PWM inverter 7 and synchronous reluctance motor 1, and the currents that have been detected by the above detectors are supplied as output signals to a uvw-dq coordinate converter 9. This uvw-dq coordinate converter creates d-axis current component Id and q-axis current component Iq for the two axes denoted as the d-axis and the q-axis, from the currents that have been detected by current detectors 8a and 8b, and from rotor position signal $\theta$ mentioned above. A current controller 10 computes and sends d-axis voltage command value Vd* and q-axis voltage command value Vq* so that d-axis current component Id and q-axis current component Iq match the above-mentioned d-axis current command Id* and q-axis current command Iq*, respectively. And the d-axis voltage command value Vd* and q-axis voltage command value Vq* that have been sent from current controller 10, and the rotor position signal $\theta$ that has been created by position detector 2 are sent to a dq-uvw coordinate converter 11, which then converts the coordinates to three-phase voltage command signals Vu*, Vv*, and Vw* and sends the signals to the PWM inverter 7 mentioned above.

Figure 2:
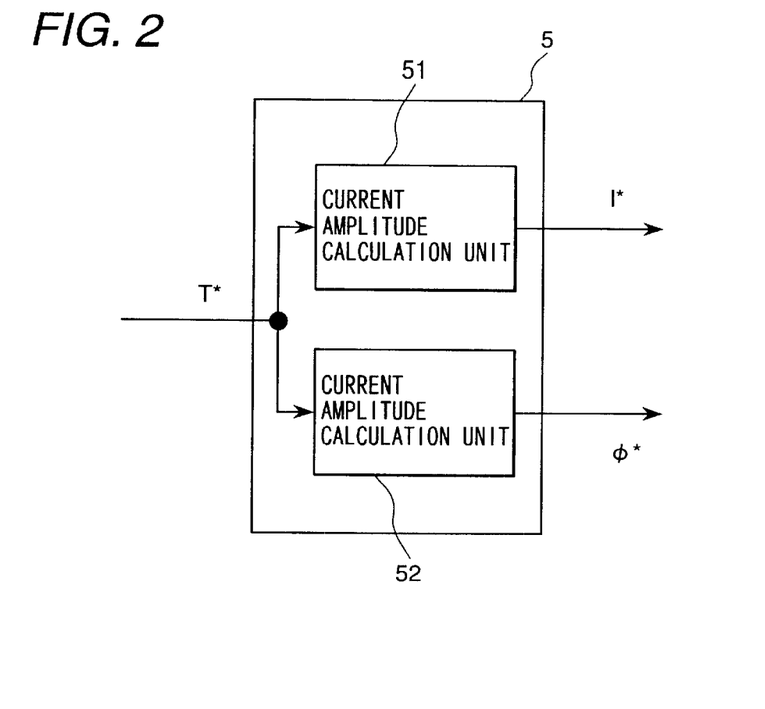
FIG. 2 is a block diagram of the maximum torque/current ratio controller shown in embodiment 1.

Next, the maximum torque/current ratio controller 5 in this embodiment is described below. A block diagram of the maximum torque/current ratio controller 5 is shown as FIG. 2. Maximum torque/current ratio controller 5 has a current amplitude calculation unit 51 and a current phase calculation unit 52. Current amplitude calculation unit 51, after receiving a torque command T* value as its input signal, computes the current amplitude command value I* that yields a maximum torque with a minimum current, by use of a linear function in which the torque command value T* is taken as a variable, and sends the results. Current phase calculation unit 52, after receiving a torque command T* value as its input signal, computes the current phase command value $\phi$* that yields a maximum torque with a minimum current, by use of a linear function in which the torque command value T* is taken as a variable, and sends the results.

Figure 3:
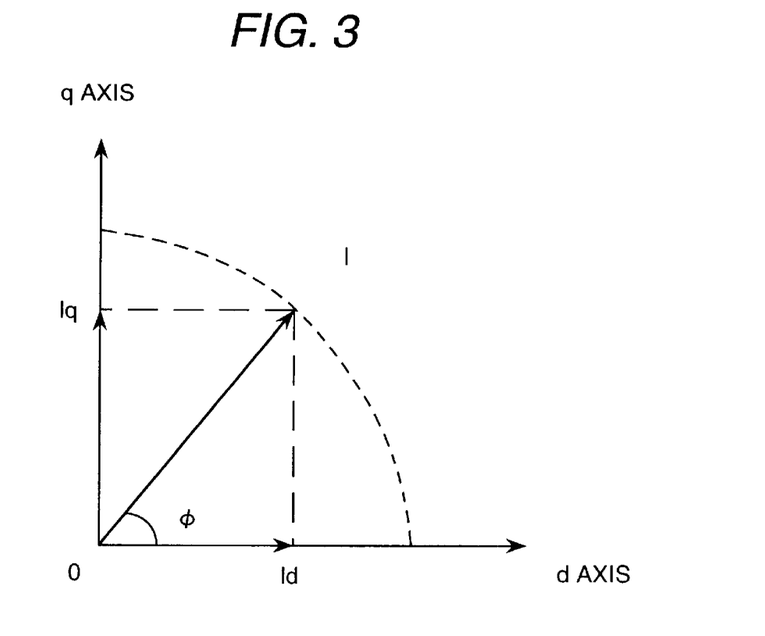
FIG. 3 is a current vector diagram of a synchronous reluctance motor.
Figure 4:
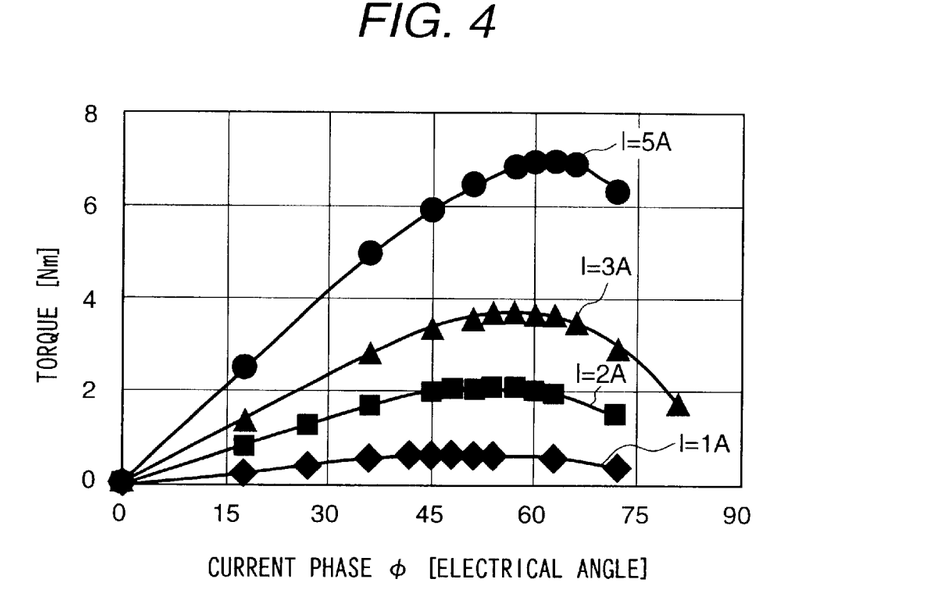
FIG. 4 is a torque characteristics diagram of the synchronous reluctance motor shown in embodiment 1.

The linear function is described in detail below. Changing the current phase $\phi$ from the d-axis (0 degrees in electrical angle) to the q-axis (90 degrees in electrical angle) with current amplitude I fixed and graphically plotting changes in the torque characteristics of the synchronous reluctance motor as shown in FIG. 3, forms a torque curve that peaks at a specific electrical angle as shown in FIG. 4. When torque curves are likewise drawn for several current amplitudes I, it can be seen that the peaks of the curves depend on the respective current amplitudes I. Based on FIG. 4, graphic plotting of the relationships between the maximum torque and current amplitudes I and between the maximum torque and current phases $\phi$ forms the curves shown in FIGS. 5 and 6.

Figure 5:
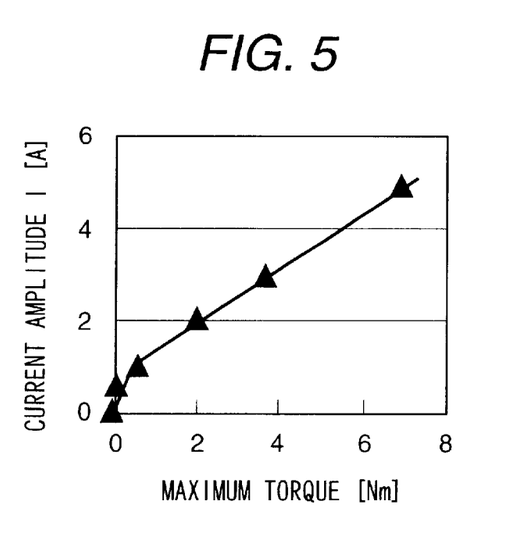
FIG. 5 is a diagram showing the relationship between the maximum torque and current amplitudes of the synchronous reluctance motor shown in embodiment 1.

The configuration of current amplitude calculation unit 51 is based on the relationship between the maximum torque and current amplitudes I, shown in FIG. 5. Similarly, the configuration of current phase calculation unit 52 is based on the relationship between the maximum torque and current phases $\phi$, shown in FIG. 6. The relationship between the maximum torque and current amplitudes I, shown in FIG. 5, and the relationship between the maximum torque and current phases $\phi$, shown in FIG. 6, can be derived beforehand from load test results, simulation results, or the like. Each such relationship is then to be formulated using one or more than one linear function and incorporated to the corresponding control block.

Figure 7:
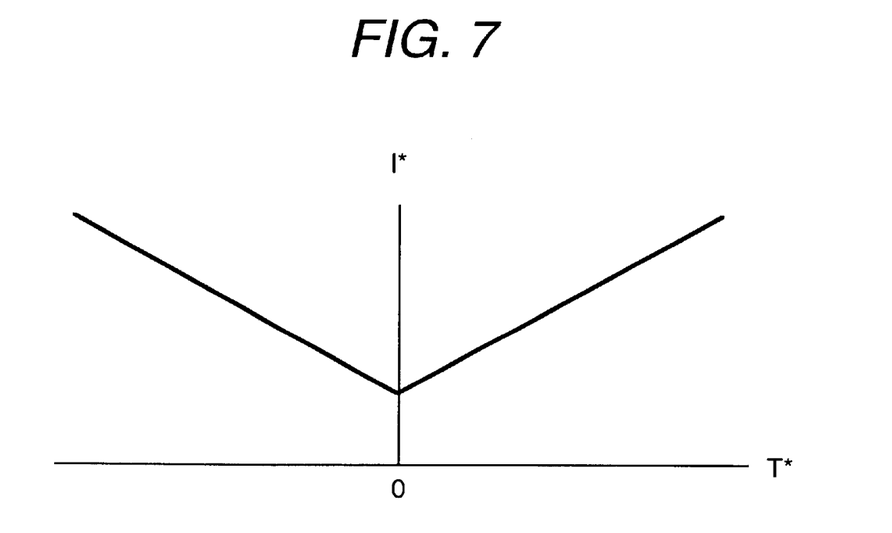
FIG. 7 is an explanatory diagram showing an example of the torque command and current amplitude command shown in embodiment 1.

First, current amplitude calculation unit 51 is described below taking a positive torque command value as an example. One method available to compute the current amplitude command value I* with which the maximum torque can be obtained is by using one linear function $$I^* = A \cdot T^* + B \tag{1}$$

where, as shown in FIG. 7, the torque command value T* is taken as the parameter. Another available method is by using the following two linear functions:

$$I^* = C \cdot T^* \tag{2}$$

$$I^* = D \cdot T^* + E \tag{3}$$

Figure 8:
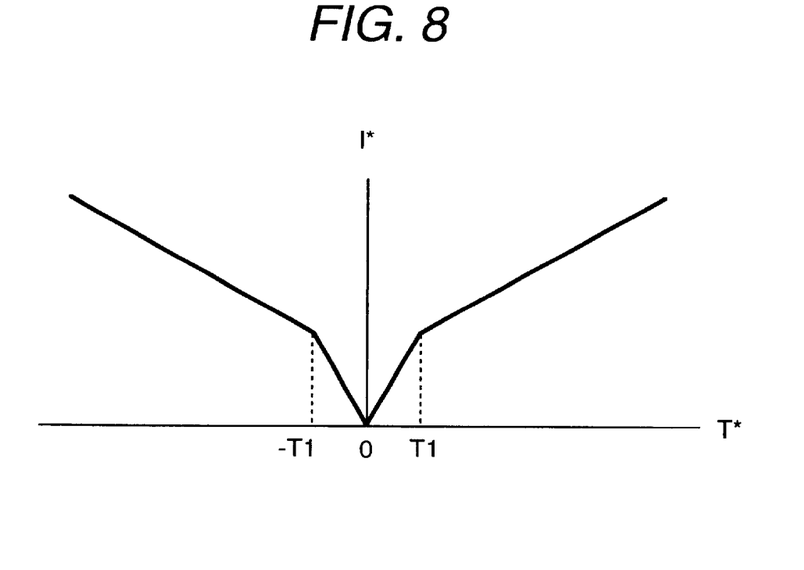
FIG. 8 is an explanatory diagram showing another example of the torque command and current amplitude command shown in embodiment 1.

When, as shown in FIG. 8, value T1 is taken as the bound, equation 2 applies if $0 \leq T^* \leq T1$, and equation 3 applies if $T1 \leq T^*$. Also, in both cases, the torque command value T* is taken as the parameter. In the above equations, coefficients A, B, C, D, and E are constants determined for each type of motor to be controlled, and these values are determined so as to enable the computation of values approximate to the current amplitude characteristics shown in FIG. 5. The number of linear function equations can be increased to three or more.

In a region small torque command value T*, in particular, it is advisable to compute the current amplitude command value by use of a linear function which, as shown in FIG. 8, passes or passes by the origin of the corresponding curve. Thereby, it becomes unnecessary to supply an excess current when there are almost no torque commands. Also, the occurrence of sudden changes torque can be avoided when the sign of the torque command value is changed from positive to negative, or vice versa.

When the torque command value T* is negative, it is advisable to use the absolute torque command value and compute the current amplitude command by use of the same numeric expression as that applied when the torque command value T* is positive.

Figure 9:
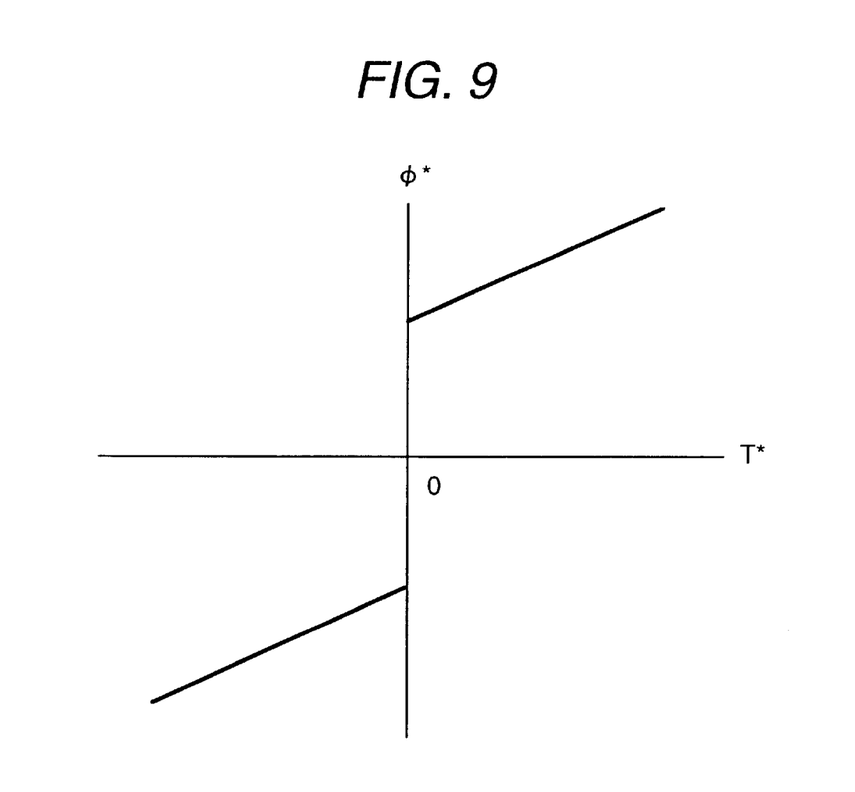
FIG. 9 is an explanatory diagram showing an example of the torque command and current phase command shown in embodiment 1.

Next, current phase calculation unit 52 is described below taking a positive torque command value as an example. One method available to compute the current phase command value φ* with which the maximum torque can be obtained is by using one linear function equation $$\phi^* = F \cdot T^* + G \qquad (4)$$

where, as shown in FIG. 9, the torque command value T* is taken as the parameter. Another available method is by using the following two linear function equations:

$$\phi^* = H \cdot T^* \qquad (5)$$

$$\phi^* = J \cdot T^* + K \qquad (6)$$

Figure 10:
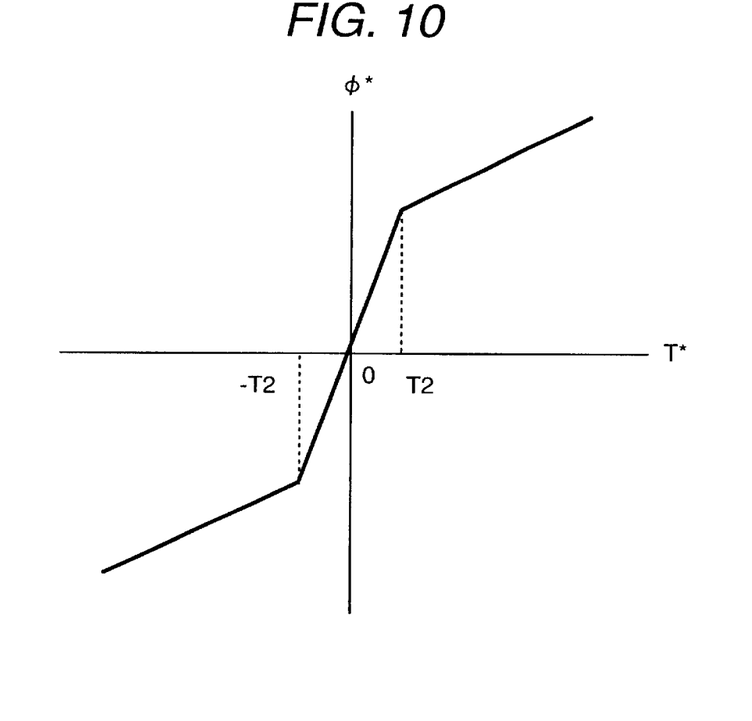
FIG. 10 is an explanatory diagram showing another example of the torque command and current phase command shown in embodiment 1.

When, as shown in FIG. 10, value T2 is taken as the bound, equation 5 applies if $0 \leq T^* \leq T2$, and equation 6 applies if $T2 \leq T^*$. Also, in both cases, the torque command value T* is taken as the parameter. In the above equations, coefficients F, G, H, J, and K are constants determined for each type of motor, and these values are determined so as to enable the computation of values approximate to the current phase characteristics shown in FIG. 6. The number of linear function equations can be increased to three or more.

When the torque command value T* is negative, it is advisable to use the absolute torque command value and compute the current phase command value φ* by use of the same numeric expression as that applied when the torque command value is positive, and then to change the current phase command value φ* to a negative sign. In a region small torque command value T*, in particular, it is advisable to compute the current phase command value φ* by use of a linear function which, as shown in FIG. 10, passes or passes by the origin of the corresponding curve. Thereby, the occurrence of sudden changes torque can be avoided when the sign of the torque command value is changed from positive to negative, or vice versa.

Methods of computation using one or more than one linear function with the torque command value T* taken as the parameter, are described above for the current amplitude command value I* and the current phase command value φ*. The number of linear functions for computing the current amplitude command value I* and the current phase command value φ*, however, can be one or more than one for each.

Figure 11:
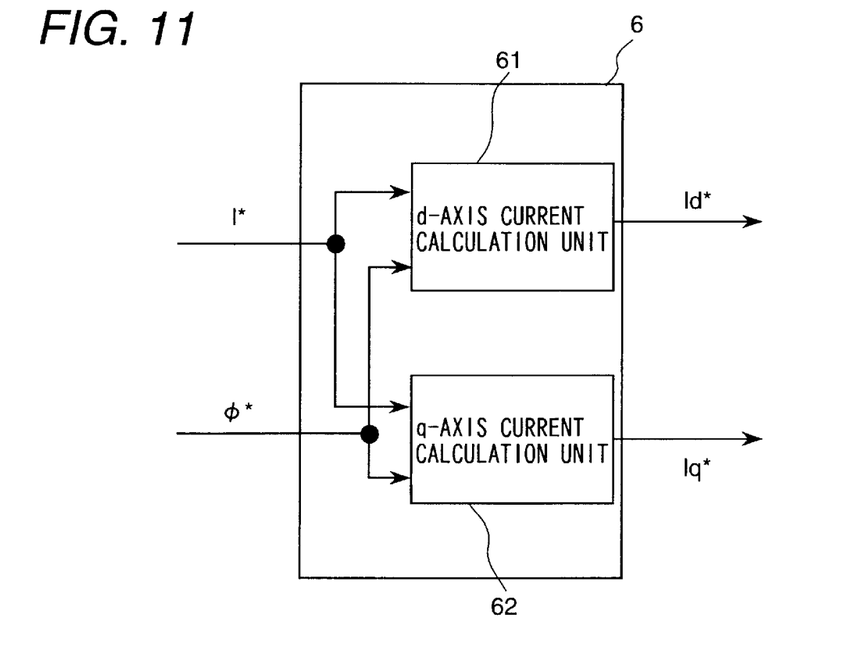
FIG. 11 is a block diagram of the current converter shown in embodiment 1.

Next, current converter 6 is described below. The configuration of current converter 6 is shown in FIG. 11. Current converter 6 has a d-axis current calculation unit 61 and a q-axis current calculation unit 62. After receiving a current amplitude command I* and a current phase command φ* as its input signals, d-axis current calculation unit 61 computes the d-axis current amplitude command value Id* by use of the following equation:

$$Id^* = L \cdot I^* \cdot \cos \phi^* \qquad (7)$$

After receiving a current amplitude command I* and a current phase command φ* as its input signals, q-axis current calculation unit 62 computes the q-axis current amplitude command value Iq* by use of the following equation:

$$Iq^* = M \cdot I^* \cdot \sin \phi^* \qquad (8)$$

where coefficients L and M are constants.

In this embodiment, position information relating to the rotor can be used after being estimated from the motor voltage, the motor current, and other factors, instead of using position detector 2. Also in this embodiment, information relating to the motor current can be used after being estimated from the motor voltage, the motor constants, other factors, or shunt resistor current information, instead of using current detectors 8a and 8b.

(Embodiment 2)

Figure 12:
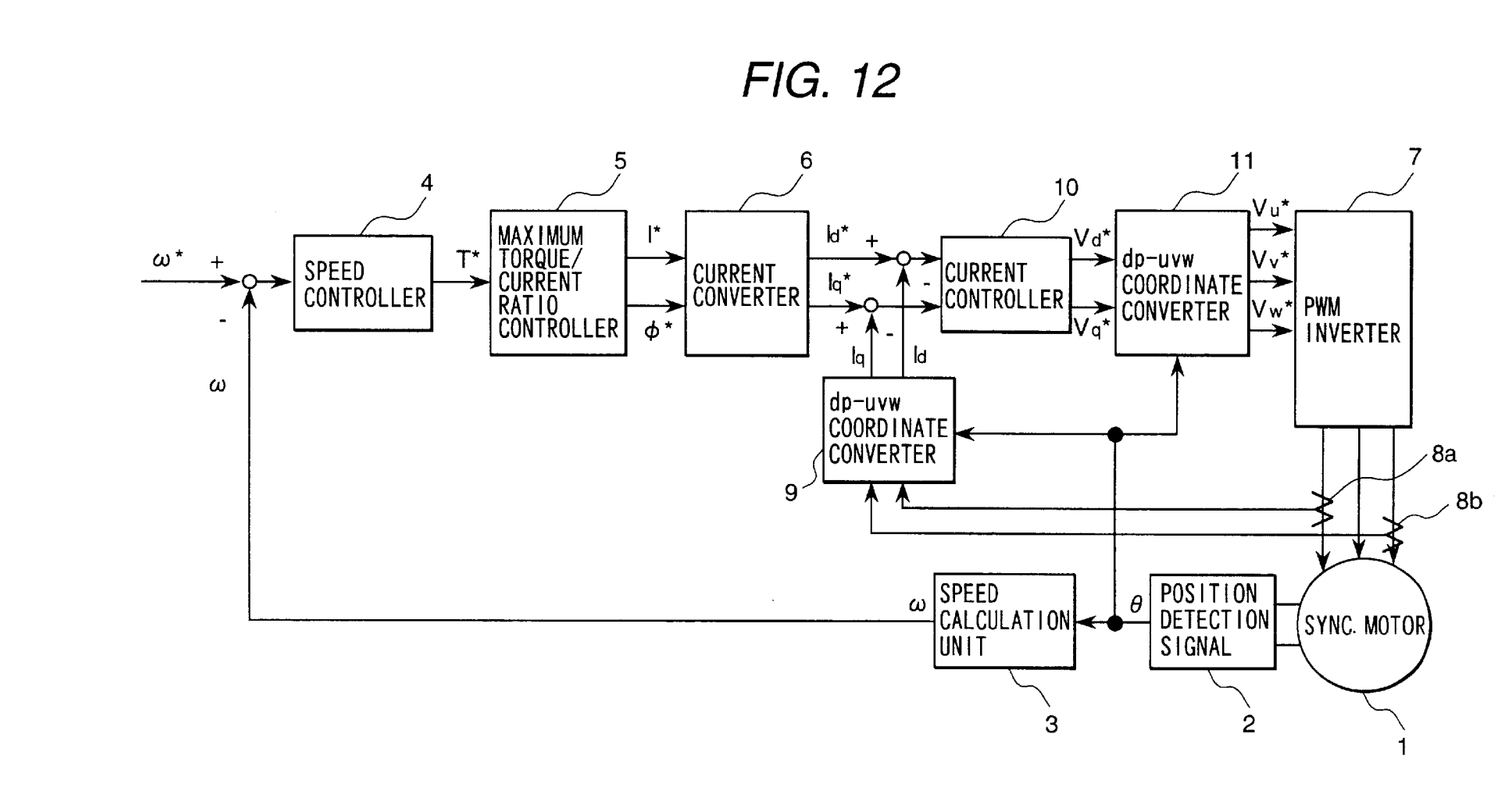
FIG. 12 is a block diagram of the synchronous motor variable-speed control system shown in embodiment 2.

A block diagram of the synchronous motor driving system used in this embodiment is shown as FIG. 12. This block diagram differs from that of FIG. 1 in that a synchronous motor 21 is used instead of synchronous reluctance motor 1. As in embodiment 1, in embodiment 2, the current amplitude command value I* and the current phase command value φ* are computed using one or more than one linear function with the torque command value T* taken as the parameter.

In this embodiment, position information relating to the rotor can be used after being estimated from the motor voltage, the motor current, and other factors, instead of using position detector 2. Also in this embodiment, information relating to the motor current can be used after being estimated from the motor voltage, the motor constants, other factors, or shunt resistor current information, instead of using current detectors 8a and 8b.

(Embodiment 3)

This embodiment is much the same as embodiment 1, except that computation accuracy on current amplitude command value I* and current phase command value φ* can be improved by computing these command values using one or more than one quadratic function (shown below) with the torque command value T* taken as the parameter, instead of using linear functions.

Figure 6:
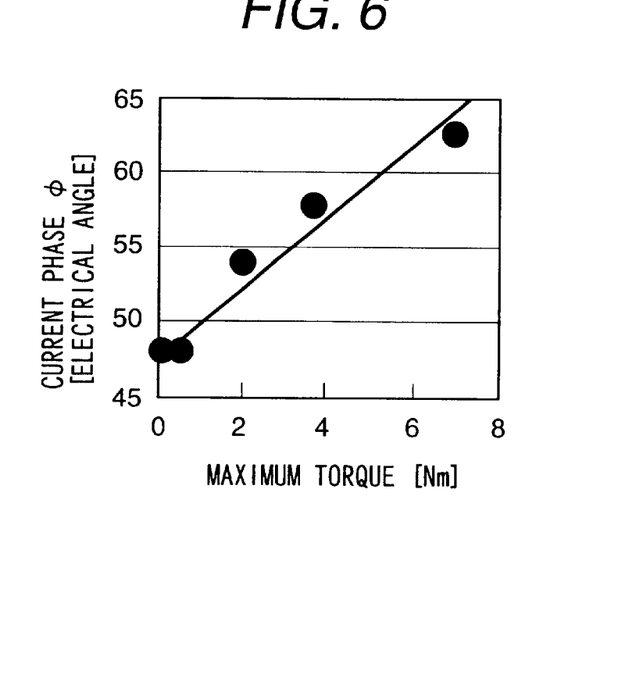
FIG. 6 is a diagram showing the relationship between the maximum torque and current phases of the synchronous reluctance motor shown in embodiment 1.

This embodiment uses one quadratic function expression $$I^* = N \cdot T^* \cdot T^* + O \cdot T^* + P \qquad (9)$$

where the current amplitude command value I* with which the maximum torque can be obtained is represented with the torque command value T* taken as the parameter. Also, the coefficients N, O, and P in the above equation are constants determined for each type of motor to be controlled, and these values are determined so as to enable the computation of values approximate to the current amplitude characteristics shown in FIG. 5. The number of quadratic function equations can be increased to two or more, or the quadratic function shown above or the linear functions shown earlier in this document can be used, depending on the particular torque command value T*. Similarly, in this embodiment, the current phase command value φ* is computed using one quadratic function $$\phi^* = Q \cdot T^* \cdot T^* + R \cdot T^* + S \qquad (10)$$

where the torque command value T* is taken as the parameter. Also, the coefficients Q, R, and S in the above equation are constants determined for each type of motor to be controlled, and these values are determined so as to enable the computation of values approximate to the current phase characteristics shown in FIG. 6. The number of quadratic function equations can be increased to two or more, or the quadratic function shown above or the linear functions shown earlier in this document can be used, depending on the particular torque command value T*.

In this embodiment as well, position information relating to the rotor can be used after being estimated from the motor voltage, the motor current, and other factors, instead of using position detector 2. Also in this embodiment, information relating to the motor current can be used after being estimated from the motor voltage, the motor constants, other factors, or shunt resistor current information, instead of using current detectors 8a and 8b.

What is claimed is:

1. A driving equipment for a synchronous motor, comprising:

an inverter for converting a direct-current voltage to an alternating current or a direct current and supplying the current to said synchronous motor;

a control apparatus for controlling the output voltage and frequency of said inverter; and a means for detecting or estimating the rotational speed of said synchronous motors; wherein said control apparatus is further equipped with a means for issuing a torque command that matches the rotational speed and a rotational speed command, and a means for receiving the torque command (T*) as an input signal, computing a current amplitude command (I*) and current phase command (φ*), and sending the commands as output signals;

said receiving, computing and sending means performs the computation of the current amplitude command (I*), and current phase command (φ*) according to the following first and second linear functions using the torque command (T*) as a parameter;

$$I^* = A \cdot T^* + B$$

$$\phi^* = F \cdot T^* + G; \text{ and}$$

A, B, F and G are constants determined for the synchronous motors to maximize achievable torque with a minimum current.

2. A driving equipment for a synchronous motor, according to claim 1, wherein:

said receiving, computing and sending means uses a third linear function for computing the current amplitude command (I*) which passes the origin of I-T coordinate in combination with the first linear function;

said third linear function is defined by the expression $$I^* = C \cdot T^*; \text{ and}$$

C is a constant determined in connection with the concerned synchronous motor.

3. A driving equipment for a synchronous motor according to claim 1, wherein;

said receiving, computing and sending means uses a fourth linear function for computing the current phase command (φ*) which passes the origin of φ-T coordinate, in combination with the second linear function;

said fourth linear function is defined by the expression, $$\phi^* = H \cdot T^*; \text{ and}$$

H is a constant determined in connection with the concerned synchronous motor.

4. A driving equipment for a synchronous reluctance motor, comprising:

an inverter for converting a direct-current voltage to an alternating current or a direct current and supplying the current to said synchronous reluctance motors, in which a plurality of annular magnetic paths are formed by providing multilayer slits in a core of the motor rotor;

a control apparatus for controlling the output voltage and frequency of said inverter; and means for detecting or estimating the rotational speed of said synchronous reluctance motor; wherein said control apparatus is further equipped with a means for issuing a torque command that matches the rotational speed and a rotational speed command, and a means for receiving the torque command (T*) as an input signal, computing a current amplitude command (I*) and a current phase command (φ*), and sending the commands as output signals;

said receiving, computing and sending means performs the computation of the current amplitude command (I*) and current phase command (φ*) according to the following first (1) and second (2) linear functions is using the torque command (T*) as a parameter;

$$I^* = A \cdot T^* + B$$

$$\phi^* = F \cdot T^* + G; \text{ and}$$

A, B, F and G are constants determined for the synchronous reluctance motor.

5. A driving equipment for a synchronous reluctance motor according to claim 4, wherein:

said receiving, computing and sending means uses a third linear function for computing the current amplitude command (I*) which passes the origin of I-T coordinate in combination with the first linear function;

said third linear function is defined by the expression $$I^* = C \cdot T^*; \text{ and}$$

C is a constant determined for the synchronous reluctance motor.

6. A driving equipment for a synchronous reluctance motor according to claim 4, wherein:

said receiving, computing and sending means uses a fourth linear function for computing current phase command (φ*) which passes the origin of φ-T coordinate in combination with the second linear function;

said fourth linear function is defined by the expression $$\phi^* = H \cdot T^*; \text{ and}$$

H is a constant determined in connection with the concerned synchronous reluctance motor.

* * * * *